UNITED STATES PATENT OFFICE.

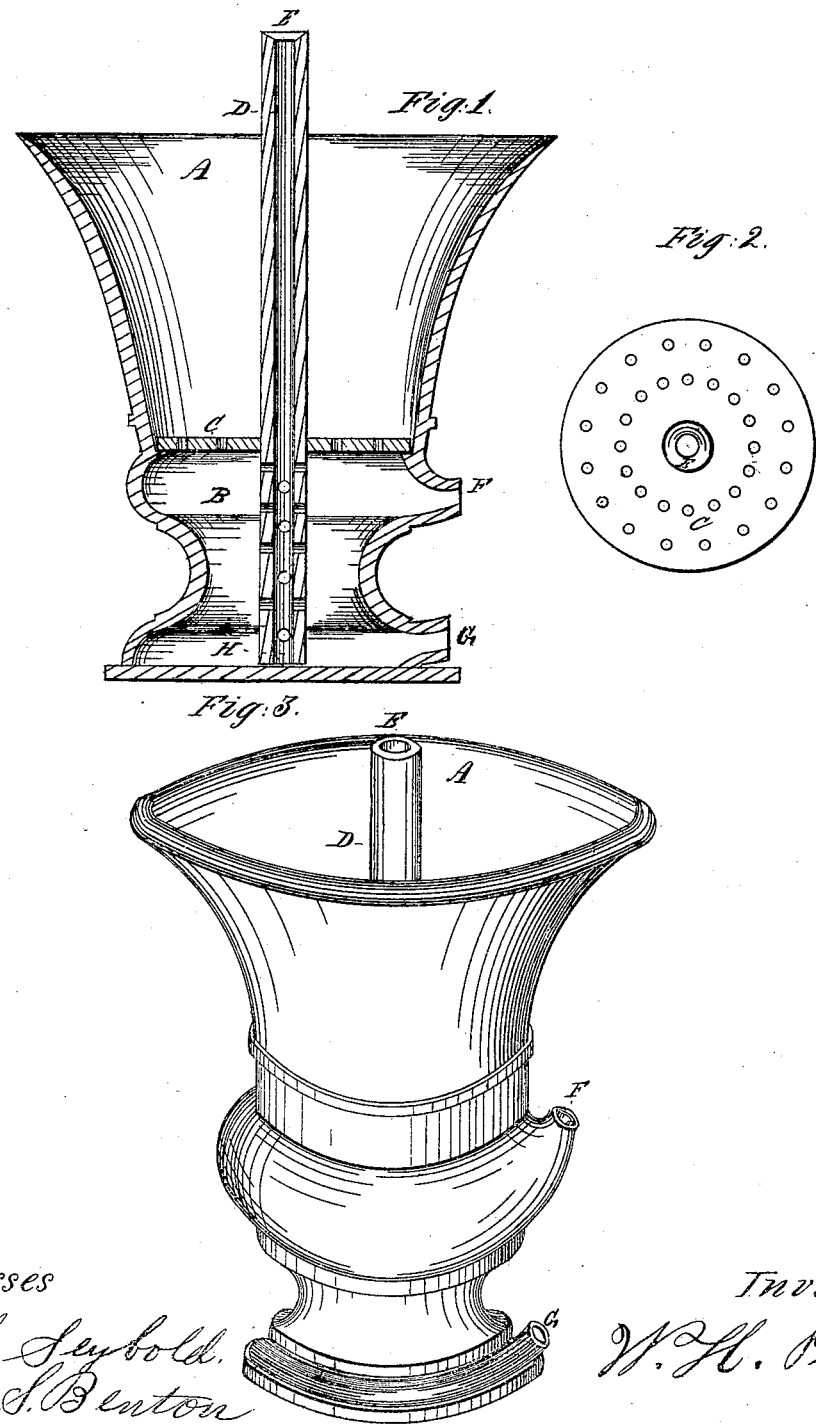

WILLIAM H. PUGH, OF CHICAGO, ILLINOIS.

IMPROVEMENT IN FLOWER-POTS.

Specification forming part of Letters Patent No. 132,178, dated October 15, 1872.

*To all whom it may concern:*

Be it known that I, WILLIAM H. PUGH, of the city of Chicago, in the county of Cook and State of Illinois, have invented certain new and useful Improvements in Flower and Plant Pots or Vessels; and I do hereby declare the following to be a full, clear, and exact description thereof, which will enable others skilled in the art to which my invention appertains to make and use the same, reference being had to the accompanying drawing forming part of this specification, in which—

Figure 1 is a vertical central section of my flower and plant pot or vessel, and Fig. 2 shows the dew-tube which passes through the perforated plate on which the earth and plant rest.

This invention consists of a vessel or other arrangement having two chambers, one above the other, separated by a perforated plate, through which passes a tube or tubes perforated below the plate.

In the drawing, A represents the earth-chamber, in which the plant is placed. B represents a chamber, into which may be put water, hot or otherwise, or any fertilizer, fluid or otherwise. C represents the perforated plate separating the two chambers. D represents a tube, which passes through the perforated plate C and extends to near the bottom of the chamber B and above the earth in the chamber A, its top opening among the leaves and flowers of the plant at E, its bottom being open at H, and the tube being perforated below the plate C. F is an orifice, by which the chamber B is filled. G is an orifice, by which the chamber B is emptied.

The mode of using and operating my invention is as follows: The plant being placed in the earth in the chamber A and the water or other fluid being placed in the chamber B, the sides of both chambers A and B and the bottom of B being glazed and impervious to water or other fluid, the water or fluid evaporating passes up through the perforated plate C by evaporation, and supplies the roots of the plant in the chamber A with water or fertilized fluid; again, the fluid, fertilized or otherwise, in the chamber B, entering the open and perforated bottom of the tube D, evaporates out of the upper end of the tube D at E and is disseminated among the leaves and flowers of the plant in the form of dew.

The orifices F and G are kept tightly corked up in dry weather and left open in very rainy weather, so that when too much rain falls into the chamber A it drains through the perforated plate C into the chamber B, and out of chamber B at the opening G, thus preventing the plant drowning out.

I do not limit my invention to the form of flower and plant pot or vessel given in Fig. 1, but it may be of any shape and size, as large boxes, hot-beds, and gardens; the invention consisting in separating two chambers by a perforated plate, through which any fluid placed in the lower chamber may evaporate into the upper chamber, and so arranged that the evaporation cannot take place in any other manner than out among the roots and foliage of the plants; and further consists in the arrangement by which dew is distributed among the leaves of the plants by means of the tube D, as hereinbefore described.

What I claim as new and as my invention, and desire to secure by Letters Patent, is as follows:

The earth-chamber A, in combination with the fluid or fertilizer chamber B, the perforated separating-plate C, the dew-tube D, and the orifices F and G, all arranged to be used and to operate substantially as and for the purposes set forth and described in the foregoing specification.

W. H. PUGH.

Witnesses:
   F. J. SEYBOLD,
   GEORGE S. BENTON.